United States Patent [19]

Higashi et al.

[11] Patent Number: 5,748,193

[45] Date of Patent: May 5, 1998

[54] FLAT PATTERN IMAGE GENERATION OF INTERNAL STRUCTURE DATA

[75] Inventors: Noboru Higashi; Koichi Sano, both of Yokohama, Japan

[73] Assignee: Hitachi, Ltd., Tokyo, Japan

[21] Appl. No.: 514,266

[22] Filed: Aug. 11, 1995

[30] Foreign Application Priority Data

Aug. 11, 1994 [JP] Japan .................... 6-189247

[51] Int. Cl.⁶ .................................................... G06T 15/10
[52] U.S. Cl. .................................................... 345/427
[58] Field of Search ........................ 395/124–125, 395/119–120; 400/413.13, 413.16, 413.19, 413.22; 345/424–427

[56] References Cited

U.S. PATENT DOCUMENTS

| | | | |
|---|---|---|---|
| 5,313,567 | 5/1994 | Civinlar et al. | 345/424 |
| 5,448,687 | 9/1995 | Hoogerhyde et al. | 345/425 |
| 5,542,036 | 7/1996 | Schroeder et al. | 345/424 |
| 5,566,282 | 10/1996 | Zuiderveld | 345/424 |
| 5,583,975 | 12/1996 | Naka et al. | 345/426 |
| 5,594,844 | 1/1997 | Sakai et al. | 345/427 |

OTHER PUBLICATIONS

Wallin, Constructing Isosurfaces From CT Data, IEEE Computer Graphics & Applications, v.11,n.6,pp. 28–33, Nov. 1991.

Araki et al., High Speed and Continuous 3D Measurement Systems, Proc. 11th IAPR Intl Conf. on Pattern Recognition, vol. IV, pp. 62–65, Aug. 1992.

"Surface Rendering", IEEE CG & A, vol. 10, pp. 41–53, Mar. 1990.

"Direct Visualization of Volume Data", T. S. Yoo et al, IEEE CG & A, vol. 10, pp. 41–53, Mar. 1990.

"A Method for the Synchronized Acquisition of Cylindrical Range and Color Data", IEICE Transaction, vol. E74, No. 10, Oct. 1991.

"Display of Surface from Volume Data", IEEE CG & A, vol. 8, No. 5, pp. 29–31, (1988).

*Primary Examiner*—Anton Fetting
*Attorney, Agent, or Firm*—Antonelli, Terry, Stout, & Kraus, LLP

[57] ABSTRACT

Three-dimensional image data of an object is generated by an x-ray CT or magnetic resonance imaging system, and used to produce a flat pattern of the whole surface image of the object. An imaginary slit is provided in a three-dimensional space of the three-dimensional image data, and the image seen through this slit is generated by volume rendering. The above operation is repeated as this imaginary slit is moved along the periphery of the object of the three-dimensional image data. The generated image data are arranged laterally to produce a flat pattern. All the three-dimensional image data are not processed by volume rendering, but only the portion limited to a depth is processed to prevent the structure information of the rear side of the object from being mixed in the flat pattern.

3 Claims, 15 Drawing Sheets

401

402

403

404

405

TOP VIEW OF (A)

SIDE VIEW OF (A)

FIG. 15A
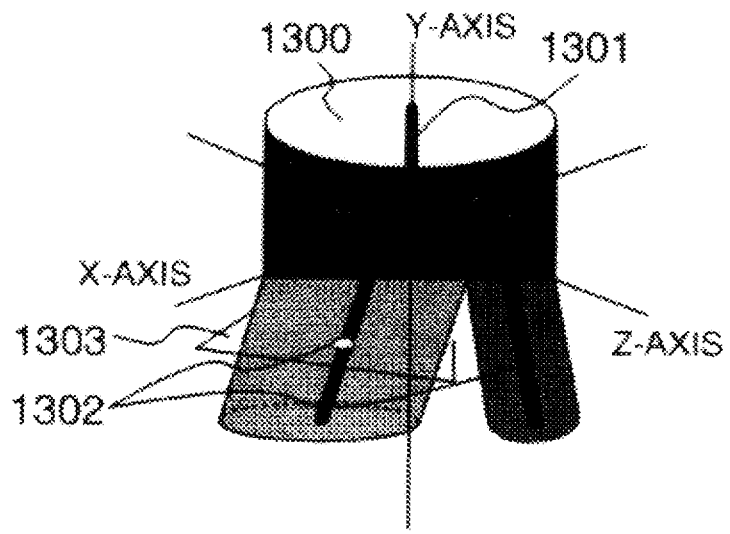
FIG. 15B
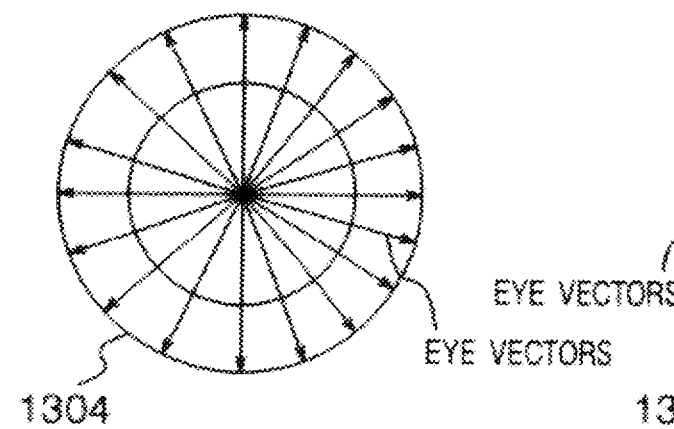
FIG. 15C
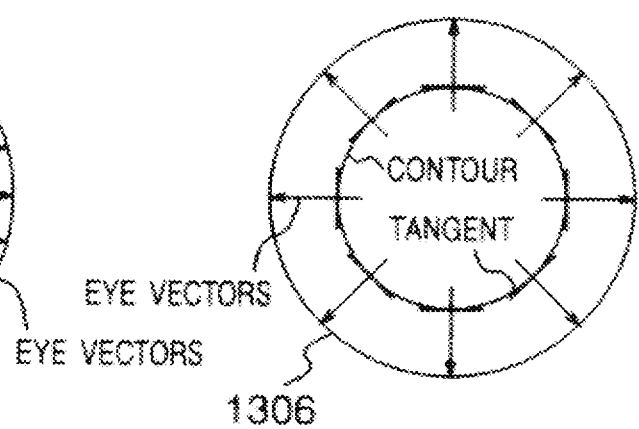
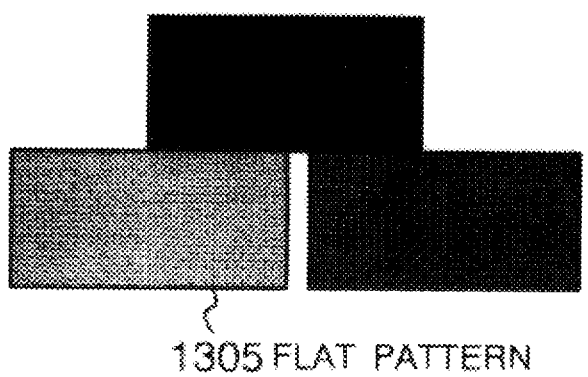
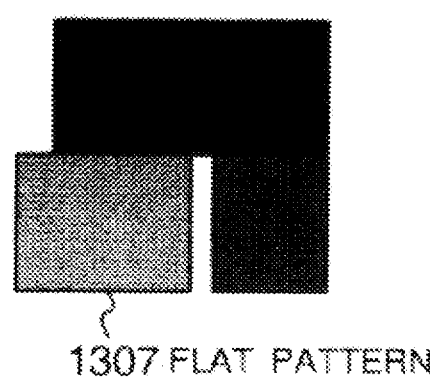

FLAT PATTERN IMAGE GENERATION OF INTERNAL STRUCTURE DATA

BACKGROUND OF THE INVENTION

The present invention relates to image processing, and particularly to a method of generating a flat pattern by expanding on a two-dimensional plane three-dimensional image data such as three-dimensional digital data which is obtained in a plurality of slices of image by, for example, an x-ray computer tomography CT or magnetic resonance imaging system.

PRIOR ART (1) Three-dimensional Displaying Method

Various three-dimensional displaying methods have so far been reported. In a document of, for example, "Display of Surface from Volume Data" written by M. Levoy, IEEE CG & A, Vol. 8, pp 29–37(1988), a volume rendering method is described for directly treating three-dimensional volume data to make three-dimensional displaying. In this volume rendering method, the light from the projected plane is permitted to pass through an opaque voxel as it is attenuated, and at this time the brightness of the voxel is determined from the opaqueness and concentration gradient of the voxel through which the light is passing, thereby making two-dimensional projection. Other displaying methods are described in "Surface Rendering", IEEE CG & A, Vol. 10, pp 41–53, (March, 1990) for three-dimensional internal data, and "Direct Visualization of Volume Data", written by Terry S. Yoo and others, IEEE CG & A, Vol. 10, pp 41–53, (March, 1990) for extracted and composite data.

(2) Flat Pattern Generating Method

In "A Method for the Synchronized Acquisition of Cylindrical Range and Color Data", IEICE TRANSACTION, Vol. E74, No. 10, October 1991, a flat pattern generating method is described which uses a detector array in which detectors are arranged within a slit of a gantry. An object being measured is placed in the inner side of the gantry. When the gantry is rotated, the slit is moved on the cylinder around the object being measured. The surface data of the object being measured is measured line by line at every very small angles of rotation by the detector array, and the surface data obtained during one revolution is attached to a wire frame model, thereby achieving a three-dimensional color image.

SUMMARY OF THE INVENTION

The general object of the invention is to obtain a desired flat pattern from the corresponding measured three-dimensional image data not by measuring the actual object by the rotating detector array.

According to this invention, three-dimensional image data of an object is generated by measurement and it is stored. The three-dimensional image data is generated by measuring a plurality of slices on an x-ray CT or magnetic resonance imaging system. An imaginary slit corresponding to the detector array in the prior art is provided in the three-dimensional space of the obtained three-dimensional image data, and a plurality of imaginary viewing points are set in this imaginary slit. Also, in the slit plane including the imaginary slit are set eye vectors which extend from the imaginary viewing points to the object of the three-dimensional image data. Image data of a slit shape is generated by viewing the object of the three-dimensional image data along the respective eye vectors. As the imaginary slit is moved around the object of the three-dimensional image data, a plurality of slit-shaped image data are sequentially generated and arranged to make a flat pattern of the object.

Thus, according to this invention, since data for making the corresponding flat pattern is generated as a group of imaginary viewing points is moved within the three-dimensional space of the three-dimensional image data without measuring the actual object by the conventional rotating detector array, it is possible to achieve a peculiarly specific characteristic which the prior art does not have. In addition, since this invention can freely arrange the viewing point group and eye vectors and set the plane in which the imaginary slit is moved, it is possible to achieve some specific objects which cannot be achieved by the prior art.

It is a first object of the invention to provide a method of generating an easy-to-observe flat pattern with the front side structure information of the object seen from the viewing point group being not superimposed upon the rear side structure information.

It is a second object of the invention to provide a method of generating a flat pattern with no discontinuity being caused even by the shape of the object.

It is a third object of the invention to provide a method of generating a flat pattern which reflects all the desired surface range irrespective of the shape of the object.

It is fourth object of the invention to provide a method of generating a flat pattern seen from the inside of the object.

According to one aspect of the invention, there is provided a flat pattern generating method having the steps of generating aimed three-dimensional image data of an object by measurement and storing it, providing an imaginary slit in the three-dimensional space of this three-dimensional data, providing a plurality of imaginary viewing points in this imaginary slit, providing in a slit plane including the imaginary slit eye vectors which extend from the respective imaginary viewing points to the object of the three-dimensional image data, generating slit-shaped image data which reflects a voxel ranging from the surface of the object to a limited depth when viewing the object of the three-dimensional image data along the respective eye vectors, repeatedly generating the slit-shaped image data as the imaginary slit is moved along the periphery of the object of the three-dimensional image data, and arranging a plurality of slit images obtained by repetitive generation to thereby obtain the corresponding flat pattern.

The imaginary slit movement is typically made along a cylindrical plane around a rotation axis so that the slit plane always includes the rotation axis. In this case, for example, slit-shaped image data is generated to reflect the voxel limited between the imaginary slit and the rotation axis in each eye vector. In place of this way, the slit-shaped image data can be generated to reflect only the voxel ranging from the surface of the object to a previously specified depth in the inside.

In general, the voxel between the imaginary slit, or imaginary viewing point and the surface of the object is zero in concentration, or transparent. Although the slit-shaped image data is generated by volume rendering, surface rendering or maximum value projection, the voxel of zero concentration does not automatically reflect the slit-shaped image data.

Thus, the first object can be achieved by the above method.

According to another aspect of the invention, there is provided a flat pattern generating method, in which slit-shaped image data is repeatedly generated by moving the imaginary slit along the contour of a cross-section of the object not along the cylindrical surface, having the steps of (1) setting a straight line as a reference line in the three-dimensional data space, (2) determining the contour of the object in a first plane which perpendicularly intersects the reference line, (3) providing the imaginary slit to perpendicularly intersect the first plane along the contour, (4) determining a perpendicular to the tangent to the contour along which the imaginary slit is provided in the first plane, and providing an imaginary viewing point group in a second plane which includes the perpendicular and the imaginary slit, (5) generating a slit-shaped image by seeing the three-dimensional image data along eye vectors extending from the imaginary viewing point group arranged in the second plane, (6) repeating the steps of (4) and (5) as the slit is moved an equal interval at a time along the contour, and (7) arranging the generated slit images to generate a two-dimensional image. Thus, the second object can be achieved by this method.

According to the above methods of the invention, typically the imaginary viewing points are arranged at equal intervals in a straight line, and the eye vectors are arranged in parallel in the slit plane so that they are extended from the respective imaginary viewing points to the object. According to still another aspect of the invention, the imaginary viewing points are arranged at equal intervals along the corresponding contour in the slit plane, and the eye vectors are set in the slit plane so that they are extended from the respective imaginary viewing points to the inside of the object and perpendicular to the tangent to the contour at each viewing point position. Thus, the third object of the invention can be achieved by this construction.

According to still further aspect of the invention, the imaginary viewing point group is placed within the inside of the object of the three-dimensional image data, and the eye vectors are set to extend from the viewing point group to the outside. Thus, the fourth object of the invention can be achieved by this construction.

BRIEF DESCRIPTION OF DRAWINGS

FIGS. 15A through 15C are conceptional diagrams showing the principle on which the embodiment of FIG. 14 generates a flat pattern.

DESCRIPTION OF THE PREFERRED EMBODIMENTS

A description will be first made of the problems which are caused when a flat pattern is generated from three-dimensional image data.

Figure 4A:
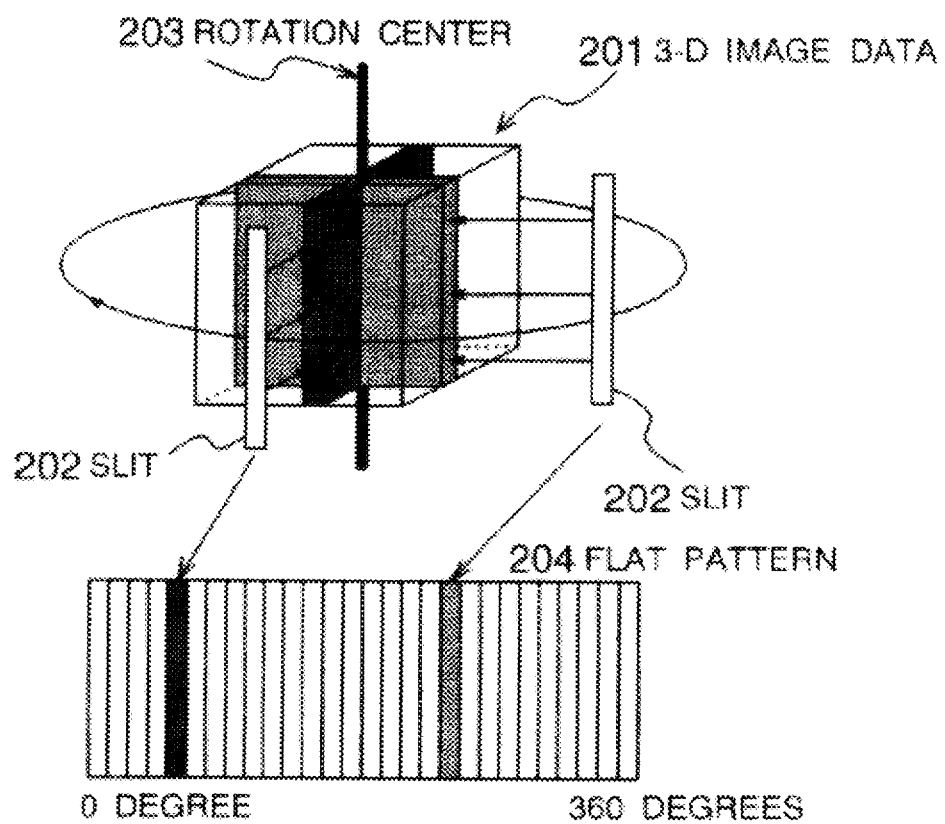
FIGS. 4A and 4B show the principle on which another embodiment generates a flat pattern.
Figure 4B:
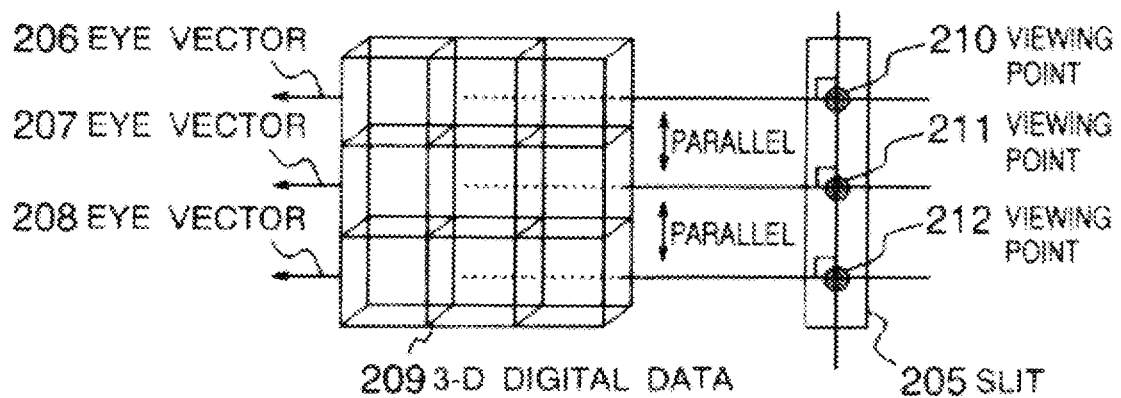
Figure 5A:
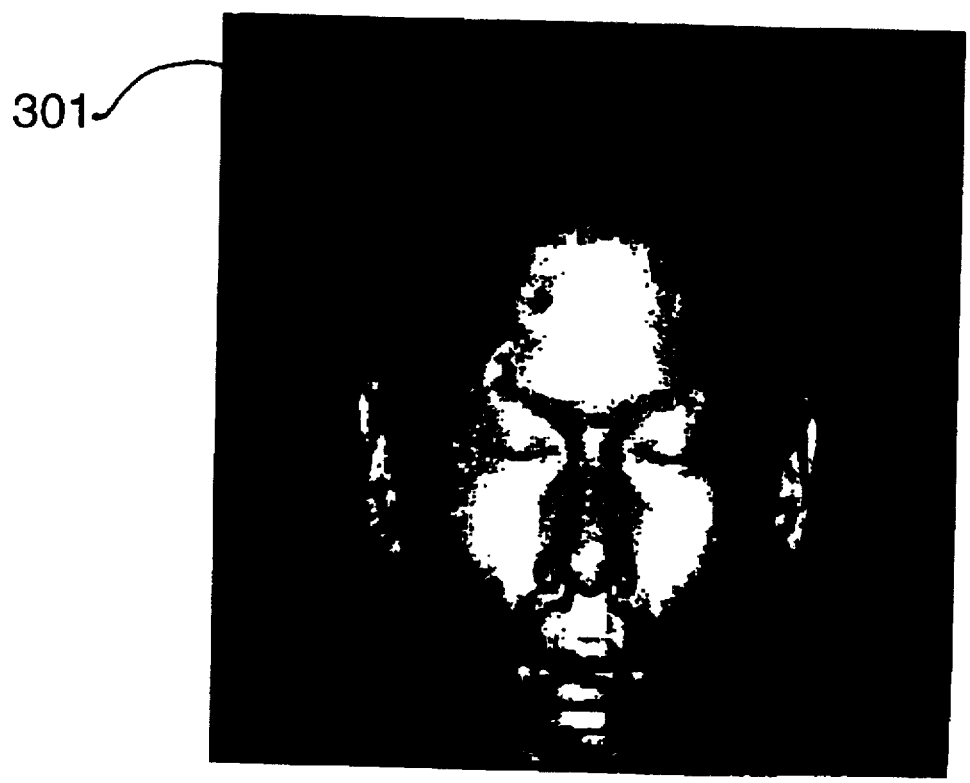
FIGS. 5A and 5B show a volume rendering front image and a flat pattern generated by volume rendering.
Figure 5B:
Figure 6A:
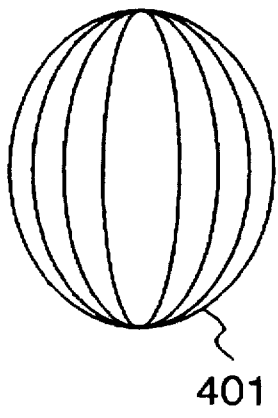
FIGS. 6A through 6E are conceptional diagrams showing one problem which is solved by this invention.
Figure 6B:
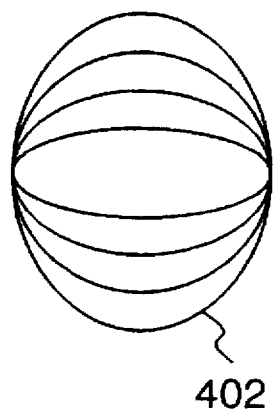
Figure 6C:
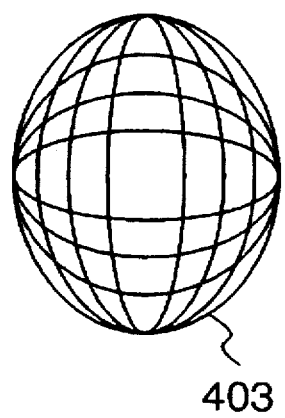
Figure 6D:
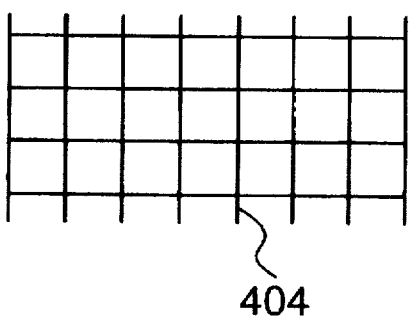
Figure 6E:
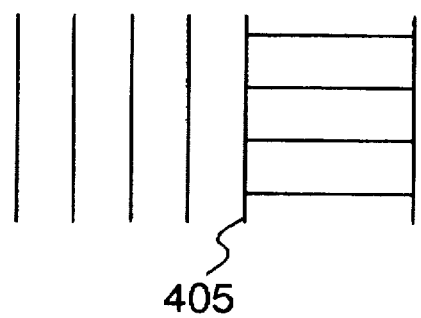

A flat pattern can be generated from three-dimensional data by using three-dimensional data instead of the object being measured (actual object) in the prior art (2) previously mentioned, and by using the volume rendering method of the technique (1) for obtaining data from the slit or other method such as surface rendering or threshold processing. That is, referring to FIGS. 4A and 4B, a slit 202 is provided on a circle which has the origin at the central point of three-dimensional data 201 and which includes the three-dimensional data. The volume rendering processing is made in the direction in which the slit 202 and a rotation axis 203 are linked, so that image data is generated through the slit 202. This operation is repeated each time the slit is moved an equal angle at a time along the circle until the slit is rotated through 360 degrees, thereby producing a flat pattern 204. In the volume rendering method (or other methods), if the viewing points and light source are located infinitely backward, eye vectors (=light traveling vectors) 206, 207, 208 in the viewing direction passing through viewing points 210, 211, 212 provided in the slit are in parallel to each other and perpendicular to the slit and intersect the rotation axis which is parallel to the slit. Then, image data seeing from the viewing points are generated from three-dimensional data 209 on the eye vectors. Although the three viewing points are set in the slit 202, a flat pattern with the same resolution as that of three-dimensional data of, for example, 256*256*256 can be generated by setting 256 viewing points in the slit. In this case, if the slit is moved one degree at a time, the flat pattern to be generated has a size of 256 in height and 360 in width. FIGS. 5A and 5B are a front image 301 and a flat pattern 302 generated by volume rendering from three-dimensional data that is obtained by MRI(Magnetic Resonance Imaging) system.

However, the above-mentioned flat pattern generating method has the problem that the front and rear data are mixed in the three-dimensional data on the eye vectors. In other words, if a two-dimensional flat pattern is generated by the above method from the three-dimensional data of wire-frame structures, for example, the generated flat pattern is not clear in the positional relation of data as shown in FIGS. 6A through 6E. That is, if the three-dimensional data has a front image 401 of only the front half, a rear image 402 of the back half and a front image 403 of the whole data, a flat pattern 404 is generated by the above method from the three-dimensional data because the back-side lines are seen in the area of no linear data. In other words, a flat pattern 405 for the spherical surface cannot be generated. Even if a picture drawn on the surface of an object as well as the linear surface pattern is desired to be converted to a flat pattern, the back-side picture still appears, so that the generated flat pattern is a mixture of front and rear pictures.

A description will be made of the problems in the conventional method of measuring the actual object by the rotating detector array.

(1) Discontinuity in Data Shape

Figure 7A:
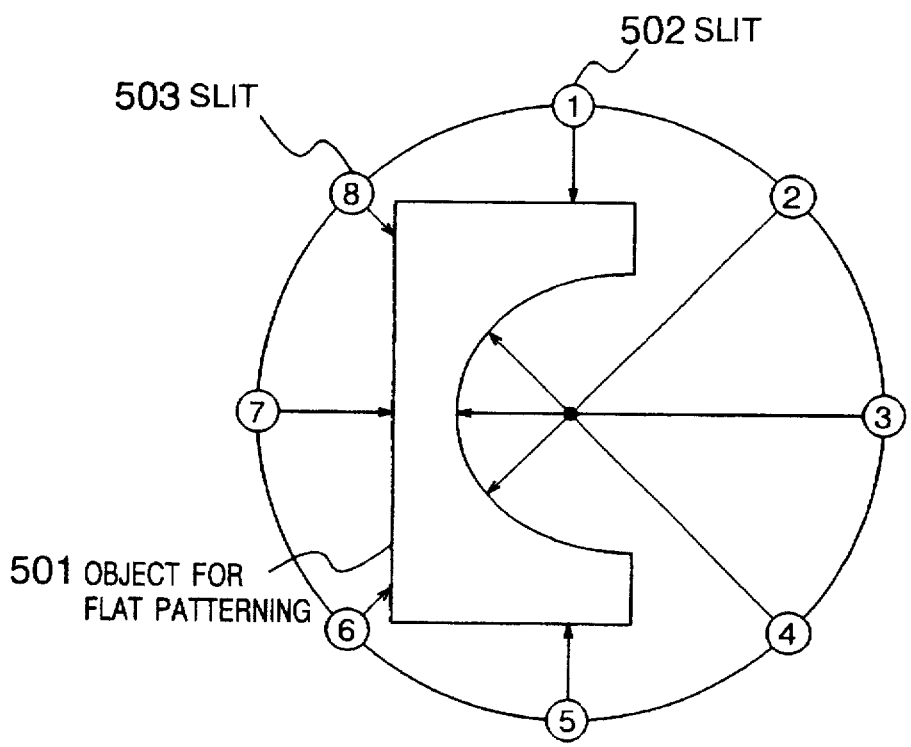
FIGS. 7A through 7C are conceptional diagrams showing another problem which is solved by the invention.
Figure 7B:
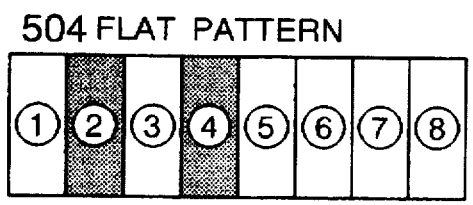
Figure 7C:
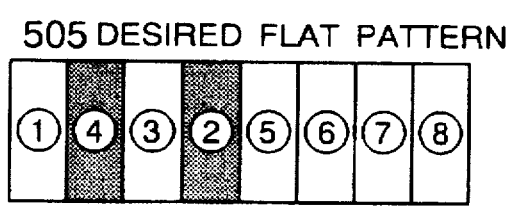

In the prior art, the continuity in the object surface is sometimes lost depending on the shape of the object when a flat pattern is generated, as shown in FIGS. 7A through 7C. FIG. 7A is a top view of the setup for a flat pattern. A slit 502 is moved clockwise through the position of a slit 503 relative to three-dimensional data 501 from which the flat pattern is generated, while images are generated by viewing it from the eight different angles and arranged laterally to produce a flat pattern 504. However, this flat pattern 504 has the continuity of surface lost, or a desired flat pattern 505 cannot be generated which keeps the surface continuity.

(2) Generation of Non-Processed Part of Surface Depending on the Shape of Data

Figure 8:
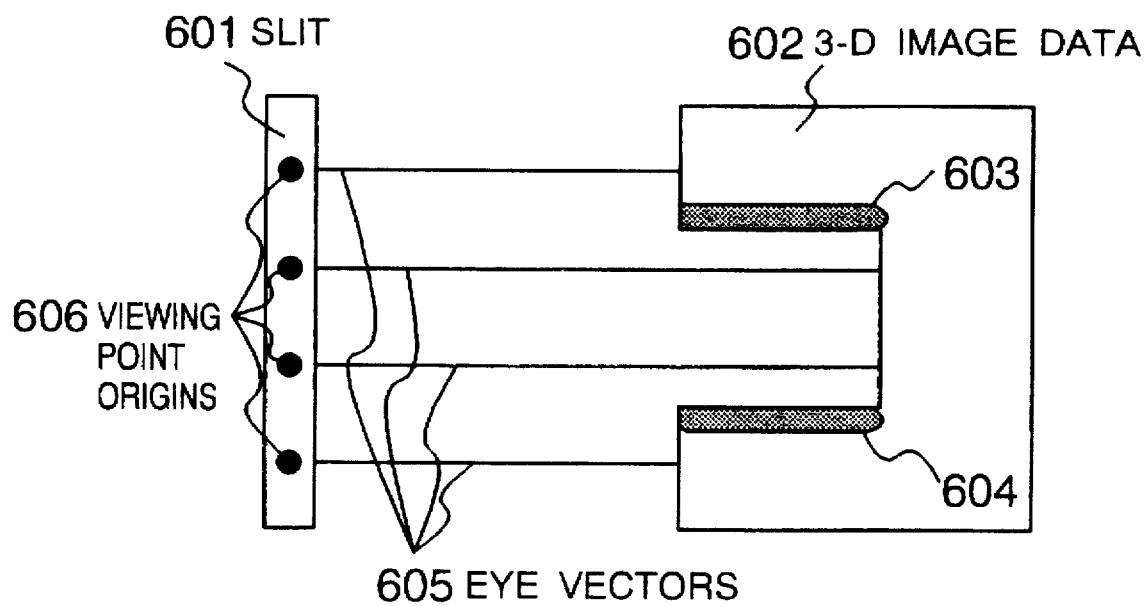
FIG. 8 is a conceptional diagram showing still another problem which is solved by the invention.

Referring to FIG. 8, since eye vectors 605 exiting from a slit 601 are needed to be parallel to each other in the prior art, the images of the surfaces of portions 603, 604 parallel to the eye vectors are lost from the generated flat pattern.

(3) Impossibility in Changing the Positions of Viewing Points (Slit)

Since the prior art uses the actual object, it is impossible to provide the viewing points within the object, and thus a flat pattern for the inside of the object cannot be produced.

Some embodiments of the invention will be described below.

(1) Embodiment Concerning the Separation of Front and Rear Sides (Embodiment 1)

A method of taking the slit-rotation axis as a boundary between the front and rear sides as one embodiment of the invention will be mentioned with reference to the flowchart of FIG. 1 and FIGS. 9A through 9C.

<Step 90>

Figure 9A:
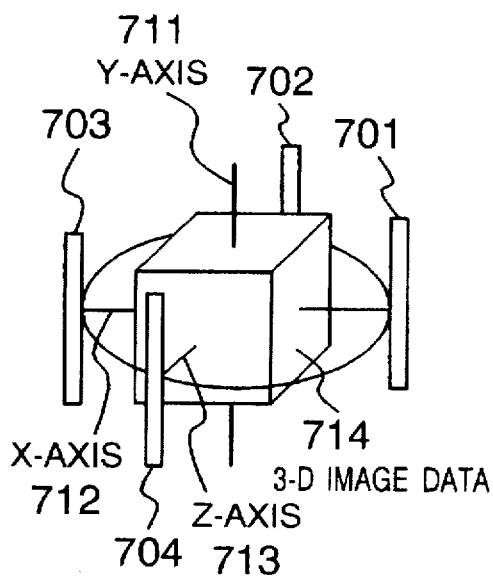
FIGS. 9A through 9C are conceptional diagrams showing the principle on which the embodiment generates a flat pattern by the front and rear separating method.
Figure 9B:
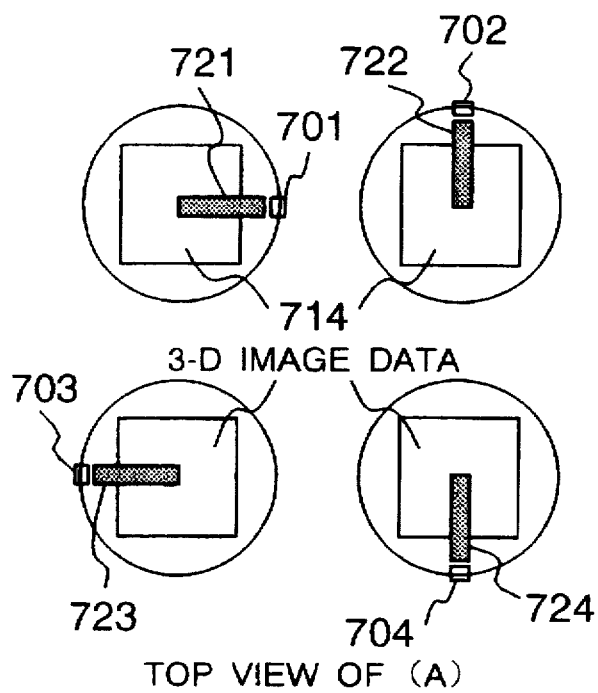
Figure 9C:
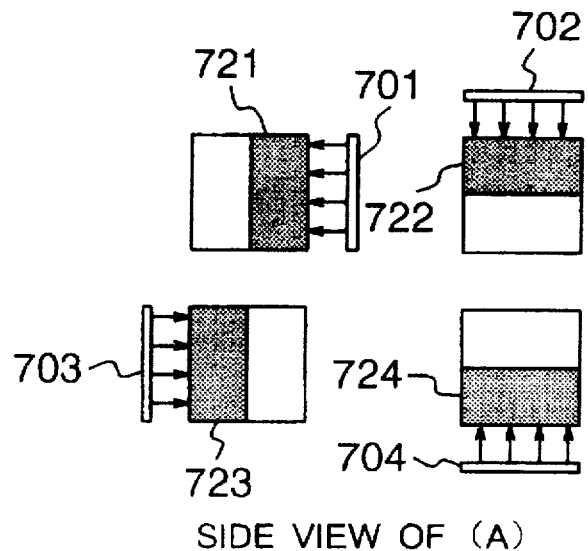

First, the object is measured by an x-ray CT or magnetic resonance imaging system so that three-dimensional image data 714 is generated as shown in FIGS. 9A through 9C. This data is stored in a memory device. Even in the other embodiments which will be described later, this step is executed first. Since this step is the same as those in all embodiments, it will not be described in the other embodiments.

<Step 100>

An X-axis 712, Y-axis 711 and Z-axis 713 are provided to have the origin at the image center of the three-dimensional data 714, and the Y-axis is used as the slit-rotation axis. A slit 701 is provided along a circle which lies in the X-Z plane including the origin and which includes the three-dimensional data, the number of viewing points which are provided in the slit 701 to be parallel to the rotation axis (Y-axis) is set, and the angle that the slit is rotated at a time along the circle is fixed.

<Step 101>

Image data (pixel value) seen from one of the viewing points provided in the slit is generated by volume rendering. The details will be mentioned later.

<Step 102>

The pixel value obtained by volume rendering at step 101 is stored in an image memory.

<Step 103>

The steps 101 and 102 are repeated a certain number of times corresponding to the number of viewing points provided in the slit.

<Step 104>

The slit is rotated by the angle fixed at step 100 around the Y-axis 711.

<Step 105>

The steps 101 through 104 are repeated until the slit is rotated through 360 degrees.

The volume rendering method is used to determine the gradient of the surface or inner layer of the object included in the three-dimensional image data and the transmissivity of light from an imaginary light source on the basis of each voxel value and make three-dimensional displaying as the sum of the reflected light rays. The imaginary light source and the imaginary viewing points in the same positions are provided at infinity point. The eye vectors (=light ray vectors) from the viewing points set in the slit are parallel to each other and perpendicular to the slit. The gradient of the surface or inner layer of the object is approximately calculated by using the concentration difference between three-direction adjacent boxels, called Gray-Level Gradients.

Figure 2:
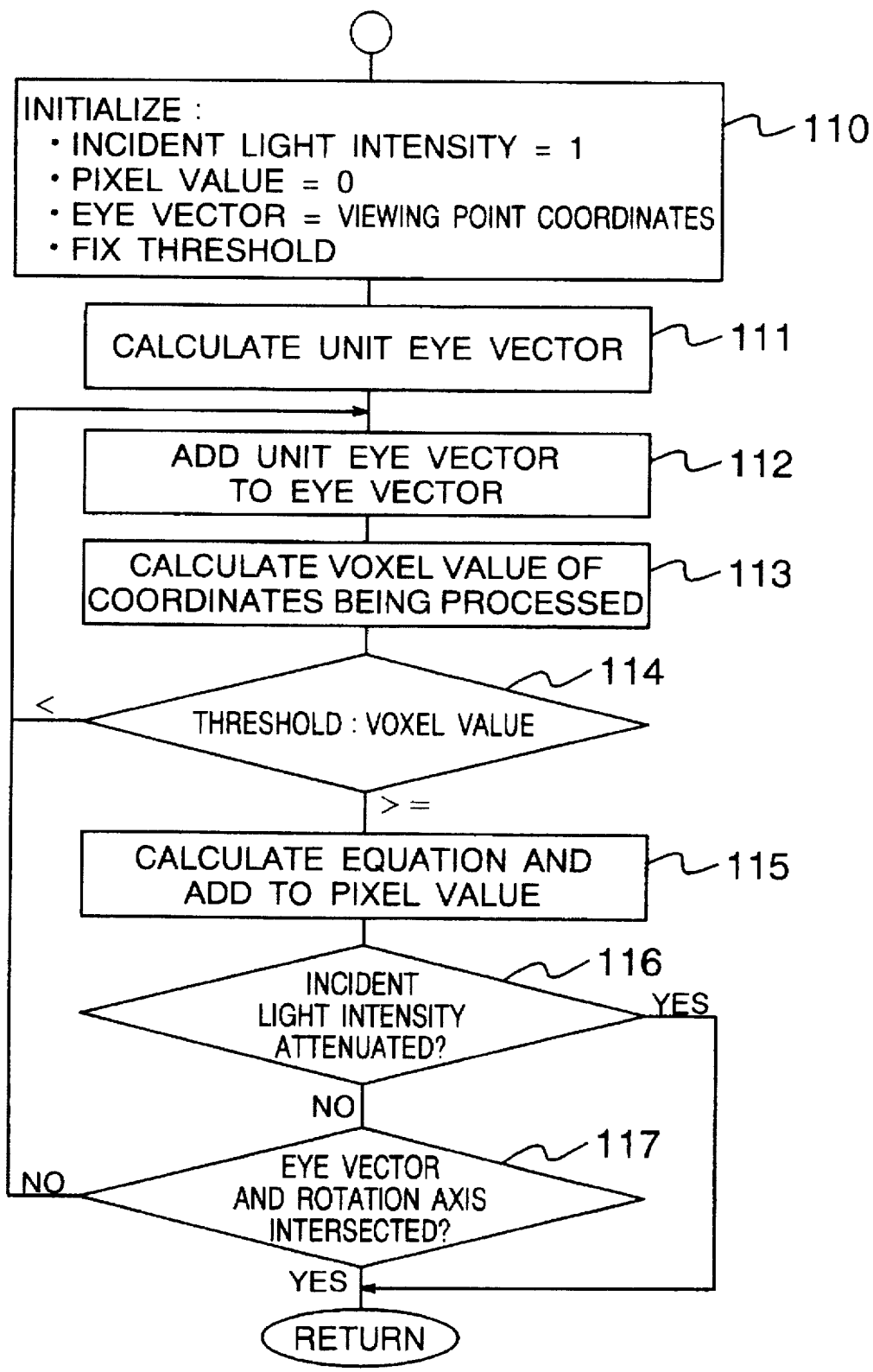
FIG. 2 is a flowchart showing a volume rendering method in the embodiment.

FIG. 2 shows a flowchart of this volume rendering processing.

<Step 110>

The initial value of incident light intensity is fixed (initial value=1). Also, the initial value of the pixel value is fixed (initial value=0). In addition, the position of an attention point on the eye vector is set at the viewing point. This point will be also called the viewing point origin in the later description. The threshold of concentration is fixed so that the pixel value reflects a voxel concentration.

<Step 111>

It determines the unit vector of eye vector.

<Step 112>

The unit vector of eye vector is added to the eye vector.

<Step 113>

The voxel value of the coordinates (attention point) indicated by the eye vector and the voxel values at the six, front, back, left, right, upper and lower points around it are calculated from the three-dimensional data by interpolation.

<Step 114>

When the voxel value on the eye vector is smaller than the threshold set at step 110, the program goes back to step 112.

<Step 115>

The following equation is calculated by substituting the voxel values obtained at step 114 into the equation, and added to the pixel value.

$$V_{lane} = \Sigma(I(P) \cdot N(P) \cdot f(P)) \quad (1)$$
$$I(P+E) = I(P) \cdot (1 - \alpha(f(P)))$$
$$N(P) = \nabla f(P)/|\nabla f(P)|$$
$$\nabla f(P) = (\{f(x+1,y,z) - f(x-1,y,z)\},$$
$$\{f(x,y+1,z) - f(x,y-1,z)\},$$
$$\{f(x,y,z-1) - f(x,y,z-1)\})$$

where I(P): incident light vector

α( ): rate of light absorption (transparency)

N(P): concentration gradient vector f(P): voxel concentration

P: calculation coordinates

E: unit vector of eye vector (=light ray vector)

<Step 116>

When the incident light intensity to the next voxel is attenuated to be zero, the processing is stopped.

<Step 117>

When the eye vector intersects the rotation axis, the processing is stopped. If it is not so, the program goes back to step 112. At this step, the rear-side data viewing from the viewing point origin can be prevented from being mixed with the front-side data. In FIGS. 9A through 9C, only three-dimensional data 721 is processed through the slit 701. Similarly, data 722 is processed at the position 702, data 723 at 703, and data 724 at 704 by volume rendering.

Although the Y-axis of the three axes (X, Y, Z) provided to have the origin at the center of the image is selected to be the rotation axis at the step 100 in the above embodiment, another one of those axes may be selected as the rotation axis. In addition, since the image center may be sometimes considerably different from the object center, the rotation axis origin can be shifted to the center of gravity of the object or the main axis of inertia of the object can be determined and used as the rotation axis.

(2) Another Embodiment Concerning the Separation of Front and Rear Sides (Embodiment 2)

Figure 3:
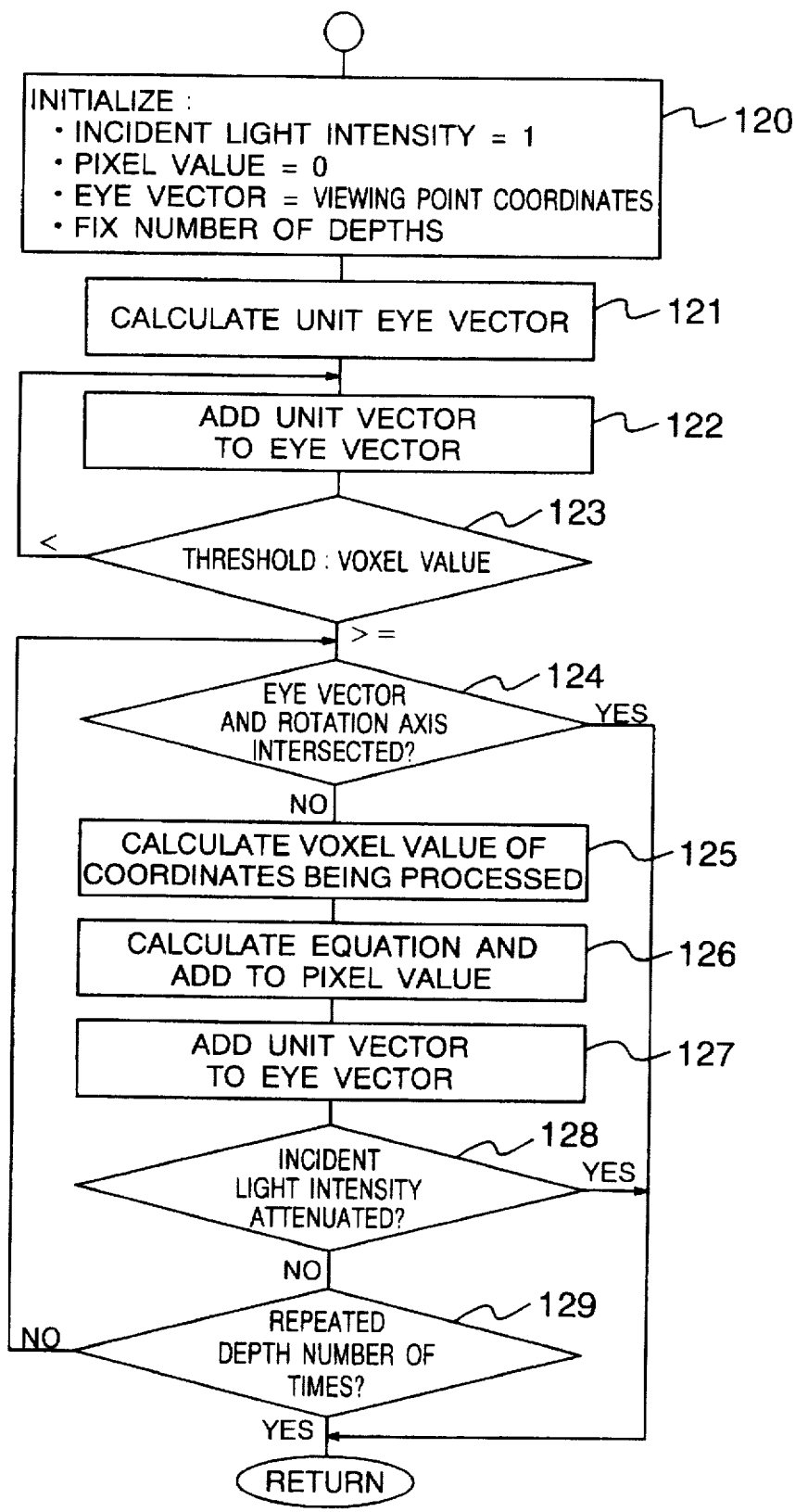
FIG. 3 is a flowchart showing another volume rendering method.

In another embodiment which can discriminate between the front and rear sides of three-dimensional data, the surface position is determined by a threshold, and data ranging from the determined surface to a previously given depth is processed by volume rendering as shown in FIG. 3. The steps other than the volume rendering process are the same as in the embodiment 1.

<Step 120>

The initial value of incident light intensity is fixed (initial value=1).

The initial value of the pixel value is fixed (initial value= 0).

The initial values of the eye vectors are fixed (viewing point origins).

A threshold value is fixed.

It determines the number of processing steps for data ranging from the surface to a depth.

<Step 121>

It determines the unit vector of eye vector.

<Step 122>

The unit vector of eye vector is added to the eye vector.

<Step 123>

It calculates the voxel value of the coordinates indicated by the eye vector. If this value is smaller than the threshold value, the program goes back to step 122.

<Step 124>

When the eye vector passes through the three-dimensional data, the processing ends. Alternatively, in the combination of the above embodiments, when the eye vector intersects the rotation axis, the processing ends.

<Step 125>

The voxel value of the coordinates indicated by the eye vector and the six, front, back, left, right, upper and lower voxel values around it are calculated from three-dimensional data by interpolation.

<Step 126>

The equation (1) is calculated by substituting the voxel values obtained at step 125 into the equation, and the calculated value is added to the pixel value.

<Step 127>

The unit vector of eye vector is added to the eye vector.

<Step 128>

When the incident light intensity to the next voxel is attenuated to be zero, the processing ends.

<Step 129>

Steps 124 through 128 are repeated a certain number of times corresponding to the number of the depths fixed at step 120.

(3) Another Embodiment for Keeping Surface Data Continuous (Embodiment 3)

Figure 10:
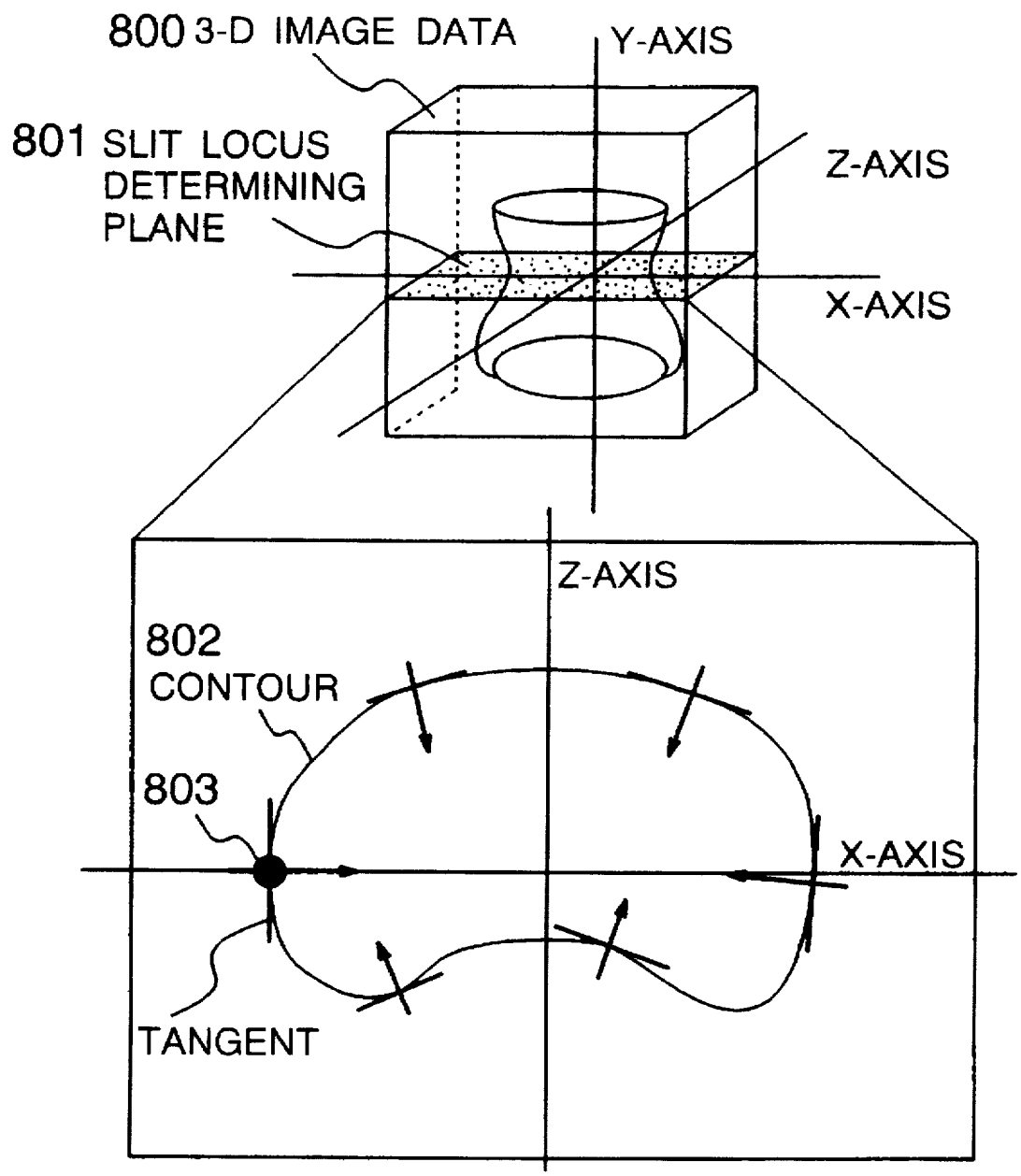
FIG. 10 is a conceptional diagram showing the principle on which still another embodiment generates a flat pattern by moving the slit along the contour.
Figure 11:
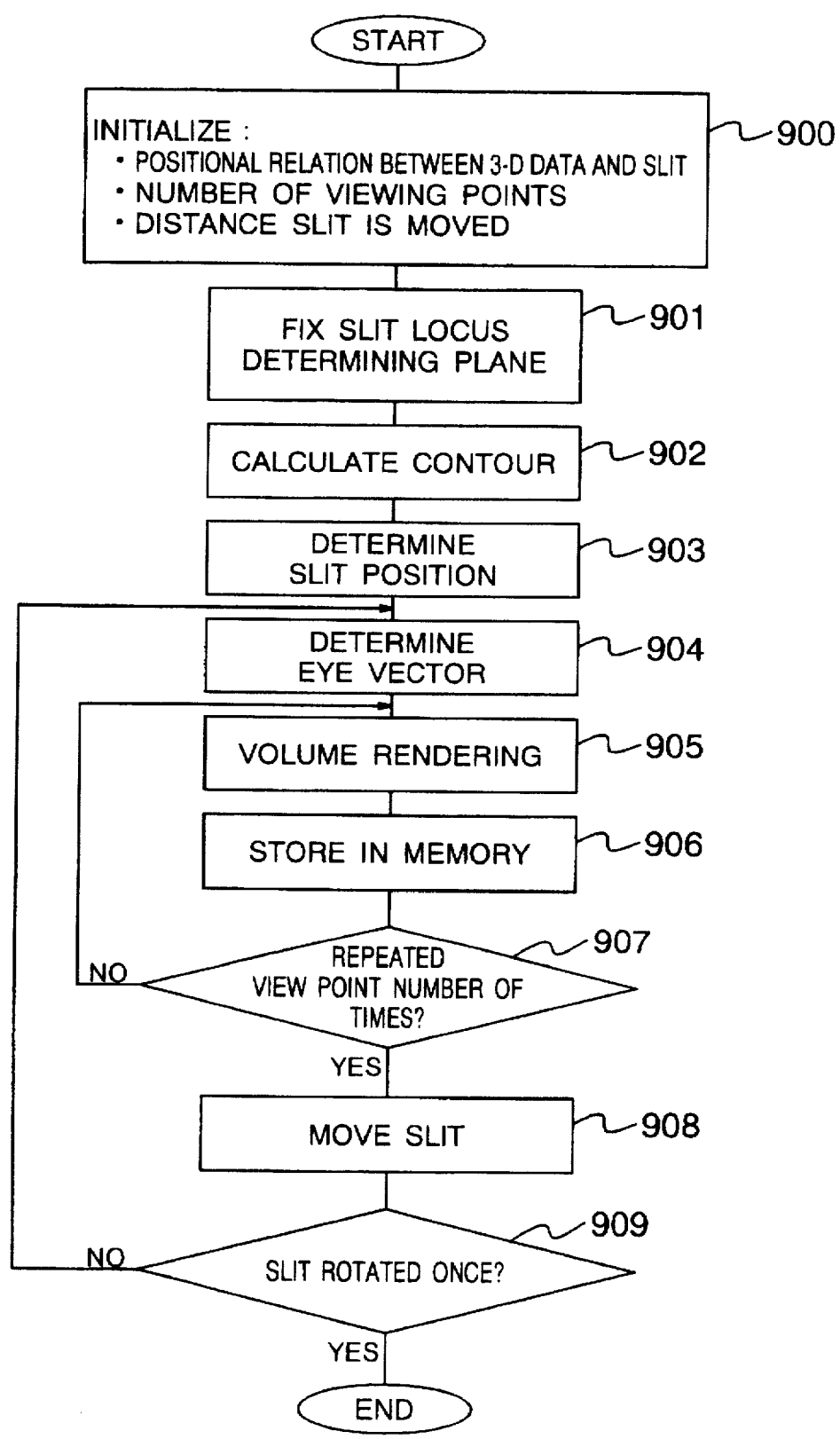
FIG. 11 is a flowchart showing the steps for generating a flat pattern according to the embodiment of FIG. 10.

It was described with reference to FIGS. 7A through 7C that in the conventional flat pattern generating method, the continuity of surface data is lost depending on the shape of the object. Thus, in order to keep the surface continuity, the slit is moved an equal interval at a time along a contour, not rotated. This operation will be described with reference to FIGS. 10 and 11.

<Step 900>

The initial values are fixed:

The distance that the slit is moved at a time; and

The number of viewing points (the number of Y-axis pixels in the flat pattern) which are set in a straight line within the slit.

<Step 901>

Axes X, Y and Z perpendicular to each other are provided to have the origin at the image center of three-dimensional data 800. The X-Z plane including the origin is selected to be a slit locus determining plane 801 for determining the locus along which the slit is moved.

<Step 902>

A contour 802 of the object is determined in the slit locus determining plane 801.

<Step 903>

At a point 803 where the contour 802 intersects theX-axis, the slit is placed to be perpendicular to the slit locus determining plane 801.

<Step 904>

At the slit set points on the contour, the tangents to the contour are decided and the eye vector from the slit is set to be perpendicular to the tangents. The tangents can be determined by use of contour information at near the points on the contour and the well-known method of least squares.

<Step 905>

The image (pixel value) seen from one of the viewing points set in the slit is produced by volume rendering.

<Step 906>

The pixel value produced at step 905 is stored in an image memory.

<Step 907>

Steps 905 and 906 are repeated a certain number of times corresponding to the number of viewing points set in the slit.

<Step 908>

The slit is moved a distance specified at step 900 along the contour 802 of the object.

<Step 909>

Steps 904 through 908 are repeated until the slit makes a round of the contour.

(4) Another Embodiment which can Provide the Non-Processed Part of Surface in the Flat Pattern (Embodiment 4)

Figure 12:
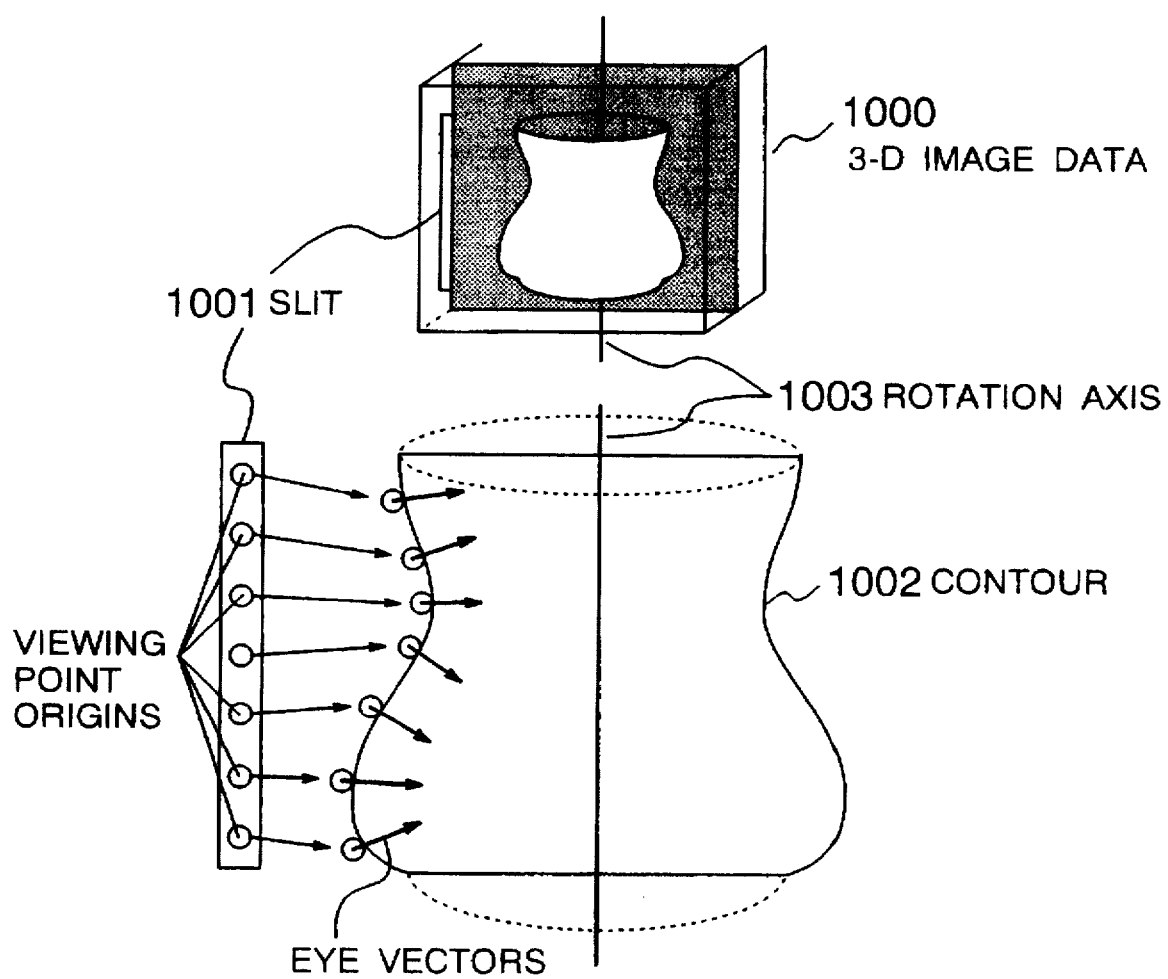
FIG. 12 is a conceptional diagram showing a method of setting the viewing points in still further embodiment.
Figure 13:
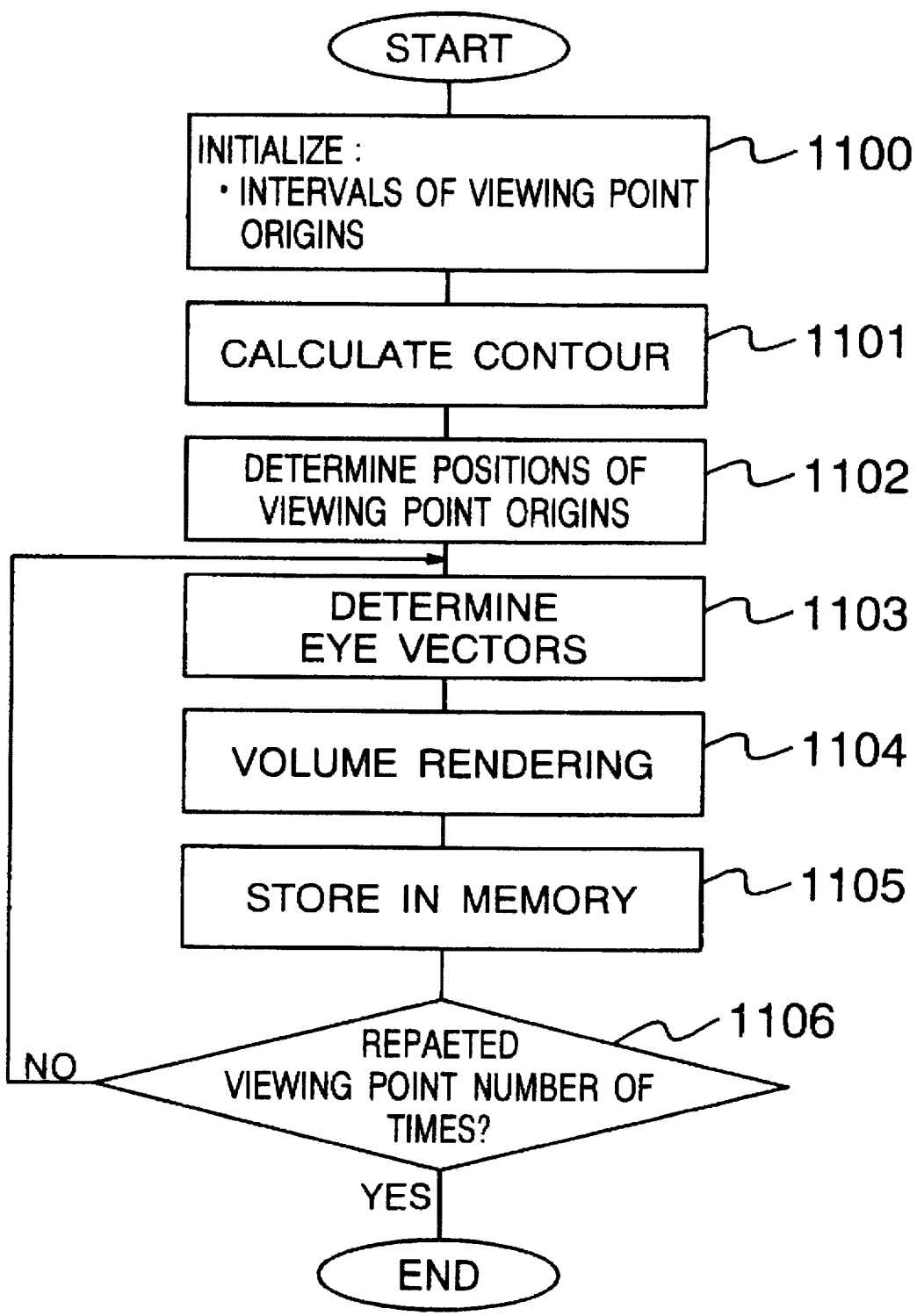
FIG. 13 is a flowchart showing the steps of setting the eye vector group and generating a flat pattern by one slit in the embodiment of FIG. 11.
Figure 14:
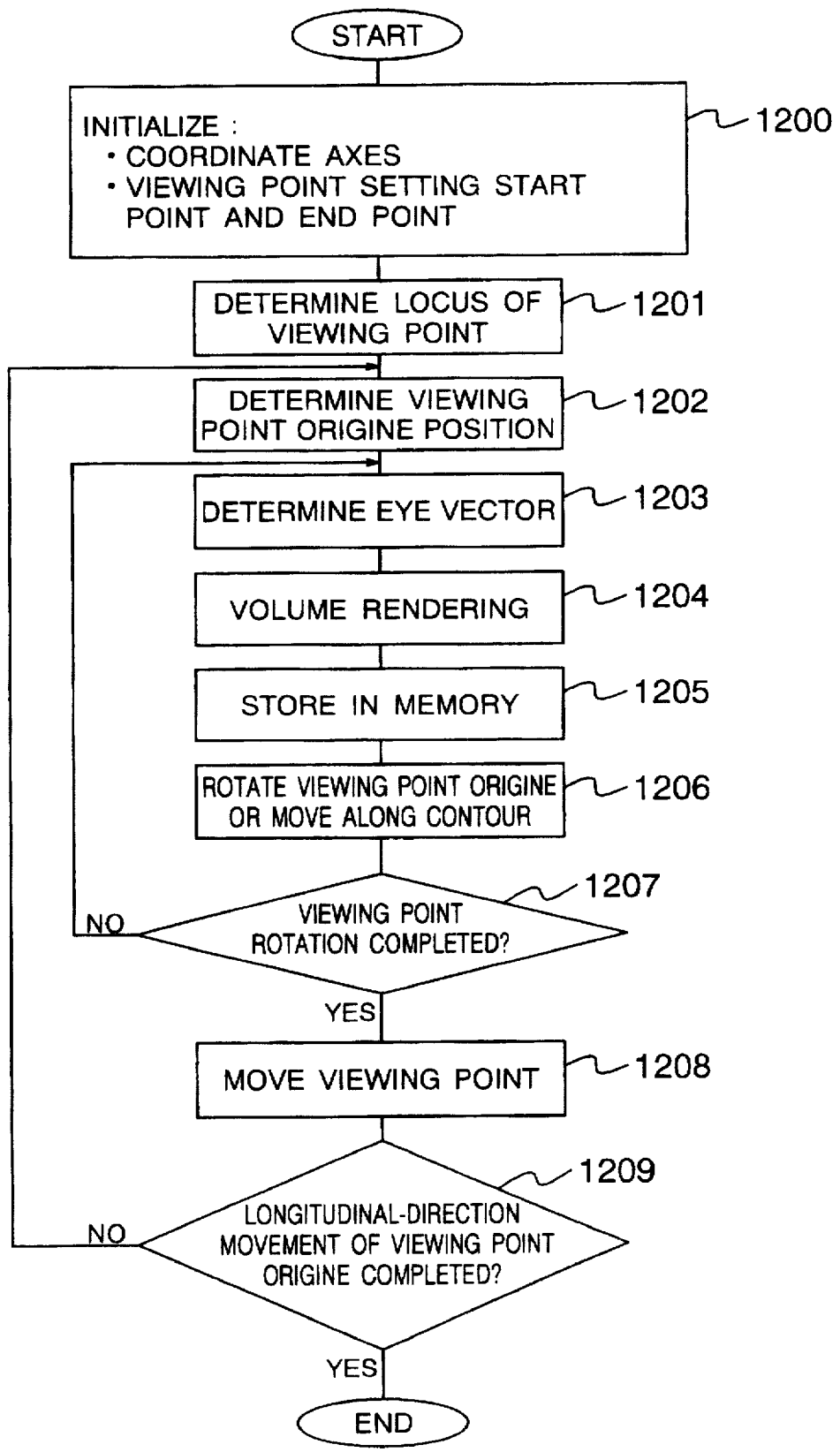
FIG. 14 is a flowchart showing the steps of generating a flat pattern in still further embodiment in which the viewing points are set within data.

It was previously described that in the prior art the portions 603, 604 parallel to the eye vectors are not reflected on the flat pattern since the image generation processing is made by use of the parallel eye vectors 605 which are generated from the viewing pint origins 606 of the slit 601 and which intersect the rotation axis. Thus, the contour of the three-dimensional data is produced on the plane including the slit and the rotation axis, and the viewing point origins are placed at equal intervals on the contour so that the eye vectors from the viewing point origins are perpendicular to the tangents to the contour at the corresponding points. In other words, instead of repeating the loop of steps 101 through 103 (calculation of pixel values at a plurality of viewing point origins on the plane including one slit) in the embodiment 1 shown in FIG. 1, the steps shown in FIG. 13 are executed in this embodiment. The repetition according to the movement of the slit is the same as in the embodiments mentioned so far. The generation of image seen from one slit will be described with reference to FIGS. 12 and 13.

<Step 1100>

Initial setting is made:

Setting of intervals at which the viewing point origins are placed along the contour.

<Step 1101>

A contour 1002 of three-dimensional data 1000 is estimated on a plane 1004 including a slit 1001 and a slit rotation axis 1003.

<Step 1102>

The viewing point origins are placed on the produced contour at the intervals specified at step 1100.

<Step 1103>

The tangents to the contour at the points where the viewing point origins are placed are obtained, and the eye vectors are produced to be perpendicular to the tangents to the contour.

<Step 1104>

The image (pixel value) seen from one of the viewing point origins is estimated by the volume rendering using the corresponding one of the vectors produced at step 1103.

<Step 1105>

The produced pixel value is stored in an image memory.

<Step 1106>

Steps 1103 through 1105 are repeated a certain number of times corresponding to the number of the provided viewing point origins. In order to generate the flat pattern, it is necessary that this operation be repeatedly made until the slit is completely moved over an angular range of 360 degrees around the three-dimensional data, and that the produced image data be arranged laterally.

Figure 1:
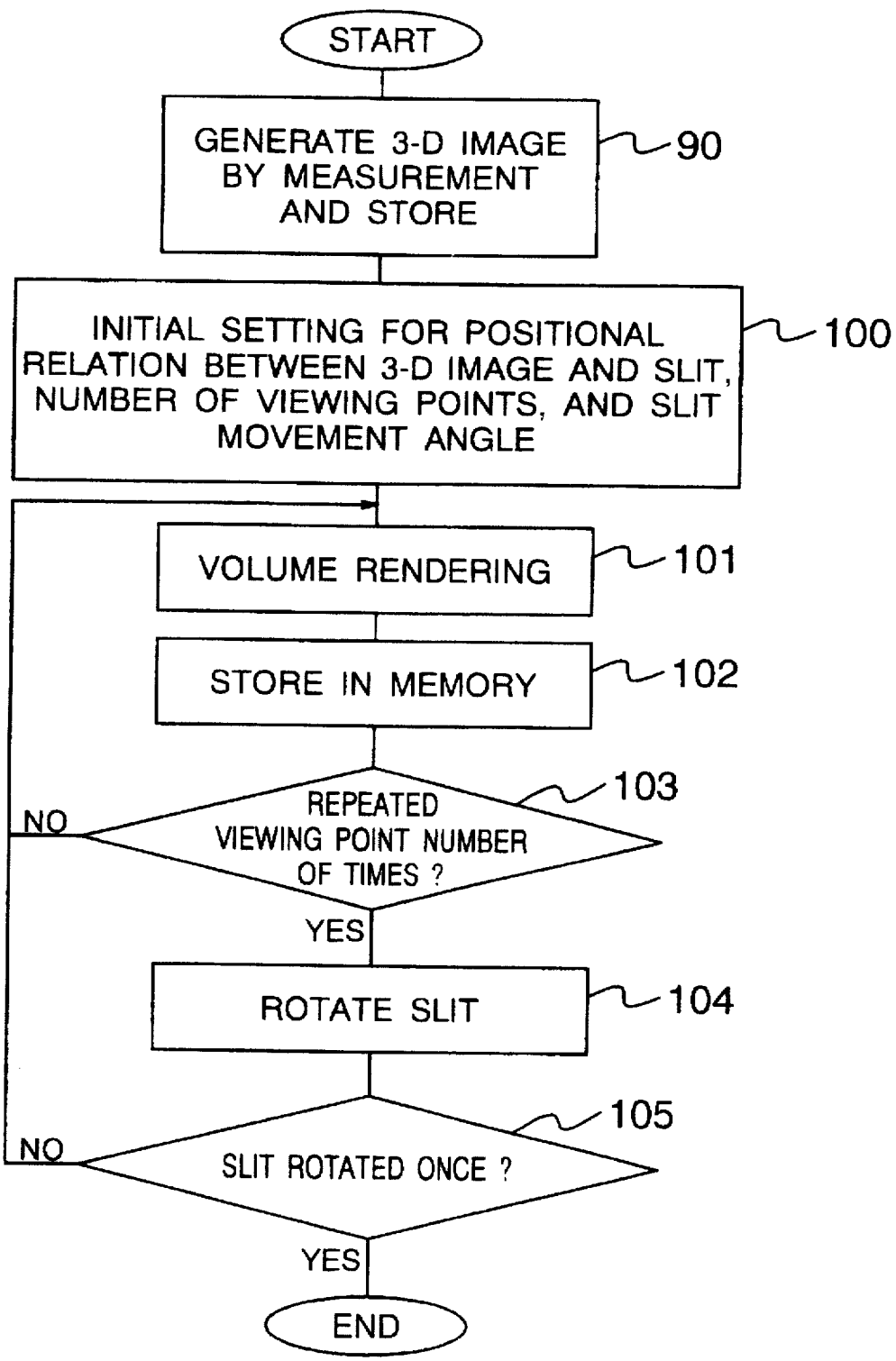
FIG. 1 is a flowchart showing all the steps for one embodiment of the invention.

The embodiment 4 is a modification of embodiment 1 shown in FIG. 1. In other words, the group of eye vectors passing through one slit is provided on the plane including the slit and the center axis. It is possible to similarly modify the embodiment 3 which was described with reference to FIGS. 10 and 11. The contour 802 is determined by the slit locus determining plane 801 shown in FIG. 10, the slit is moved an equal distance at a time along the contour 802, perpendiculars to the tangents to the contour 802 at the respective slit positions are determined, and the plane including the group of eye vectors is selected to be the plane including the perpendiculars and the slit. In this case, the eye vectors are not in parallel to each other but perpendicular to the respective tangents to the contour 102 as shown in FIGS. 12 and 13. When the embodiment 3 is modified so that the direction of each of the eye vectors is changed, the flat pattern including information of all surface can be generated even from the three-dimensional image data of which the surface shape is complicated.

(5) Another Embodiment which can Generate a Flat Pattern of the Inside of the Object by Moving the Viewing Points (Embodiment 5)

The slit (viewing point position) is so far provided outside the data, and thus only the flat pattern of the outside of the object is produced. This embodiment provides the slit within the data, making it possible to generate the flat pattern of the inside of the object.

The steps for this purpose will be described with reference to FIGS. 15A through 15C.

<Step 1200>

Initial setting:

It provides X, Y and Z axes to have the origin at the image center of three-dimensional data 1300.

It determines the rotation angles of the viewing point origins.

<Step 1201>

A locus 1301 is determined along which the viewing point is moved. As one example of this determination, the contour of the object being measured is produced for each slice of the object, and a line connecting the points of gravity of the contours is selected to be the locus along which the viewing point is moved.

<Step 1202>

A viewing point origin 1302 is provided at one point on the viewing point movement locus.

<Step 1203>

An approximate straight line of the locus is produced by using forward and backward points on the contour at around the viewing point origin and by the method of least squares. An eye vector is produced in a plane 1303 which includes the viewing point origin and which is perpendicular to the approximate straight line.

<Step 1204>

Image data of one pixel is generated by volume rendering.

<Step 1205>

The produced image data is stored in the image memory.

<Step 1206>

The viewing point origin is rotated by the rotation angle obtained at step 1200 around the approximate straight line as the rotation axis.

<Step 1207>

Steps 1204 through 1206 are repeated until the viewing point origin is rotated through 360 degrees (as indicated at 1304).

<Step 1208>

The viewing point origin is moved along the locus.

<Step 1209>

Steps 1203 through 1208 are repeated until the viewing point origin passes over the end point determined at step 1200.

Thus, a flat pattern 1305 is generated by the above steps. In this embodiment, instead of rotating the viewing point itself through 360 degrees to make a flat pattern, it can be moved (as indicated at 1306) along the contour mentioned in the embodiment 3 to make a flat pattern 1307.

(6) Other Embodiments (Embodiment 6)

While in the embodiments 1 through 5 the volume rendering method is used for the image generating processing, images may be produced by other methods. For example, the generally known surface rendering, threshold method or MIP (Maximum Intensity Projection) may be used.

In addition, when the eye vectors are produced to be perpendicular to the tangents to the contour of the object, the obtained contour of the object is smoothed so that the minute variations of the contour can be suppressed.

Moreover, it is possible to make combinations of two embodiments 1 and 4, 2 and 3, 2 and 4, 3 and 4, and 2 and 5.

The following effects can be achieved by this invention.

(1) The generated flat pattern of three-dimensional data does not include a mixture of the front and rear side information.

(2) The X-axis positional information of the generated flat pattern is continuous irrespective of the shape of three-dimensional data.

(3) The portions of the object which cannot be reflected on the flat pattern in the prior art can be shown in the flat pattern irrespective of the shape of three-dimensional data.

(4) While in the prior art the slit is rotated around the rotation axis, this invention detects the contour and permits the slit to move an equal distance at a time along the contour so that an image of equal resolution can be generated in a flat pattern.

(5) Since the viewing point can be freely provided, the inside of the object can be shown in a flat pattern.

What is claimed is:

1. A flat pattern generating method for generating a flat pattern from three-dimensional image data of an object having a hollow structure, comprising:

a step (1) of determining a locus within said hollow structure along which a viewing point is moved;

a step (2) of providing said viewing point at a certain point on said locus and determining a plane orthogonal to said locus and including said viewing point;

a step (3) of rotating said viewing point by a predetermined angle up to an angular range of 360 degrees in said determined plane so as to visualize the internal structure of said object from said viewing point, thereby producing an image of one line;

a step (4) of moving said viewing point along said locus and repeating said step (3), thereby producing a series of images of one line each; and a step (5) of linearly arranging said generated series of images of one line each to produce a two-dimensional image.

2. A flat pattern generating method for generating a first pattern from three-dimensional image data of an object having a hollow structure, comprising:

a step (1) of determining a locus within said hollow structure along which a viewing point is moved;

a step (2) of providing said viewing point at a certain point on said locus and determining a plane orthogonal to said locus and including said viewing point;

a step (3) of determining a contour of said object in said determined plane;

a step (4) of moving said viewing point by an equal interval at time along said contour, determining a tangent to said contour at each point of said viewing point, providing an eye vector perpendicular to said tangent, and visualizing the internal structure of said object through said viewing point to produce an image;

a step (5) of moving said viewing point along said locus and repeating said steps (2) to (4) to produce a series of images; and a step (6) of arranging said generated series of images to produce a two-dimensional image as said flat pattern.

3. A flat pattern generating method according to claim 1, further comprising a step of determining a portion to be displayed by scanning three-dimensional image data on said eye vectors which extend from said viewing point, and making image generation processing by use of three-dimensional data ranging from the position of said determined portion to a predetermined depth in the direction of said eye vectors.

* * * * *